United States Patent
Panek et al.

(10) Patent No.: US 9,818,051 B2
(45) Date of Patent: Nov. 14, 2017

(54) ROTATION AND CLIPPING MECHANISM

(71) Applicants: Alexandru-Virgil Panek, Ghiroda (RO); John Thomas Varga, Longmont, CO (US)

(72) Inventors: Alexandru-Virgil Panek, Ghiroda (RO); John Thomas Varga, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/011,007

(22) Filed: Jan. 29, 2016

(65) Prior Publication Data

US 2017/0220911 A1  Aug. 3, 2017

(51) Int. Cl.
*H04N 1/46* (2006.01)
*H04N 1/04* (2006.01)
*H04N 1/387* (2006.01)
*G06K 15/02* (2006.01)

(52) U.S. Cl.
CPC ..... *G06K 15/1842* (2013.01); *G06K 15/1802* (2013.01); *G06K 15/1813* (2013.01); *G06K 15/1889* (2013.01); *G06K 2215/0014* (2013.01)

(58) Field of Classification Search
None
See application file for complete search history.

(56) References Cited

U.S. PATENT DOCUMENTS

| | | | | |
|---|---|---|---|---|
| 5,204,916 A * | 4/1993 | Hamilton, Jr. | ........ | G06T 3/0006 358/3.07 |
| 5,263,136 A * | 11/1993 | DeAguiar | ........... | G06F 12/0875 345/538 |
| 5,347,596 A * | 9/1994 | Dominguez, Jr. | ..... | G06K 15/00 345/656 |
| 5,574,578 A * | 11/1996 | Dresch | ................. | H04N 1/0657 358/487 |
| 5,805,174 A * | 9/1998 | Ramchandran | ........ | G06K 15/00 345/501 |
| 5,930,813 A * | 7/1999 | Padgett | .................... | G06T 11/60 715/205 |
| 5,990,904 A * | 11/1999 | Griffin | .................. | G06T 11/001 345/631 |
| 6,034,699 A * | 3/2000 | Wong | ....................... | G06T 11/40 345/441 |
| 6,166,748 A * | 12/2000 | Van Hook | ................ | A63F 13/00 345/522 |
| 6,597,363 B1 * | 7/2003 | Duluk, Jr. | ............. | G06T 15/005 345/506 |
| 6,744,442 B1 * | 6/2004 | Chan | ....................... | G06T 15/04 345/582 |
| 6,943,809 B2 | 9/2005 | Dermer | | |
| 7,170,515 B1 * | 1/2007 | Zhu | ....................... | G06T 15/005 345/422 |

(Continued)

*Primary Examiner* — Madelein Nguyen
(74) *Attorney, Agent, or Firm* — Alpine Technology Law Group LLC

(57) ABSTRACT

A method is disclosed. The method includes intersecting a clip polygon with a source image, determining destination coordinates of the clip polygon, rasterizing the clip polygon, determining a bounding box, dividing the bounding box into a plurality of logical destination tiles, processing the destination tiles to determine coordinates of source tiles corresponding to each of the destination tiles and performing rotation processing of the source tiles, wherein each tile is processed independently.

20 Claims, 13 Drawing Sheets

(56) References Cited

U.S. PATENT DOCUMENTS

| | | | |
|---|---|---|---|
| 7,327,487 B2 | 2/2008 | Prosi | |
| 7,602,403 B2 | 10/2009 | Hamburg | |
| 7,928,992 B2 | 4/2011 | Liu et al. | |
| 8,009,316 B2 | 8/2011 | Varga | |
| 8,705,118 B2 | 4/2014 | Smith | |
| 9,036,926 B2 | 5/2015 | Panek | |
| 9,117,309 B1* | 8/2015 | Crow | G06T 11/203 |
| 9,641,644 B2* | 5/2017 | Levanon | H04L 67/327 |
| 2002/0085010 A1* | 7/2002 | McCormack | G06T 11/40 345/545 |
| 2002/0126124 A1* | 9/2002 | Baldwin | G09G 5/39 345/533 |
| 2002/0196467 A1* | 12/2002 | Delhoune | G06K 15/02 358/1.18 |
| 2003/0193497 A1* | 10/2003 | Yhann | G06T 7/181 345/419 |
| 2005/0134603 A1* | 6/2005 | Iourcha | G06T 11/20 345/611 |
| 2007/0165035 A1* | 7/2007 | Duluk, Jr. | G06T 1/60 345/506 |
| 2007/0285697 A1* | 12/2007 | Ebina | B41L 13/06 358/1.12 |
| 2008/0012879 A1* | 1/2008 | Clodfelter | H04N 9/12 345/619 |
| 2009/0231639 A1* | 9/2009 | Iwayama | H04N 1/3878 358/488 |
| 2011/0148901 A1* | 6/2011 | Adams | G06T 11/40 345/589 |
| 2013/0021358 A1* | 1/2013 | Nordlund | G06T 11/40 345/581 |
| 2014/0026946 A1* | 1/2014 | West | F24J 2/5205 136/251 |
| 2014/0267382 A1 | 9/2014 | Steiner et al. | |
| 2015/0015571 A1* | 1/2015 | Yuda | G06T 15/005 345/419 |

* cited by examiner

ROTATION AND CLIPPING MECHANISM

FIELD OF THE INVENTION

This invention relates generally to the field of printing systems. More particularly, the invention relates to image processing.

BACKGROUND

In a variety of document presentation systems such as printing systems, it is common to rasterize data to generate a bitmap representation of each sheetside image of the document by processing a sequence of data objects. The data objects are typically initially defined in a page description language or other suitable encoding and at some point prior to writing to a bitmap are transformed by hardware and/or software to be represented as regions of rectangles of pixels. Typically, the sheetside image is then generated into a bitmap memory as a two dimensional matrix of pixels representing the intended document sheetside image, and subsequently compressed.

During sheetside processing of complex meta-streams certain objects are rasterized at an arbitrary (e.g., non-orthogonal) rotation angle and clip against a complex clip path. Not all transforms support functionality enabling rotation and complex clipping.

Accordingly, a mechanism to enable rotation and clipping is desired.

SUMMARY

In one embodiment, a method is disclosed. The method includes intersecting a clip polygon with a source image, determining destination coordinates of the clip polygon, rasterizing the clip polygon, determining a bounding box, dividing the bounding box into a plurality of logical destination tiles, processing the destination tiles to determine coordinates of source tiles corresponding to each of the destination tiles and performing rotation processing of the source tiles, wherein each tile is processed independently.

BRIEF DESCRIPTION OF THE DRAWINGS

A better understanding of the present invention can be obtained from the following detailed description in conjunction with the following drawings, in which.

DETAILED DESCRIPTION

A rotation and clipping mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
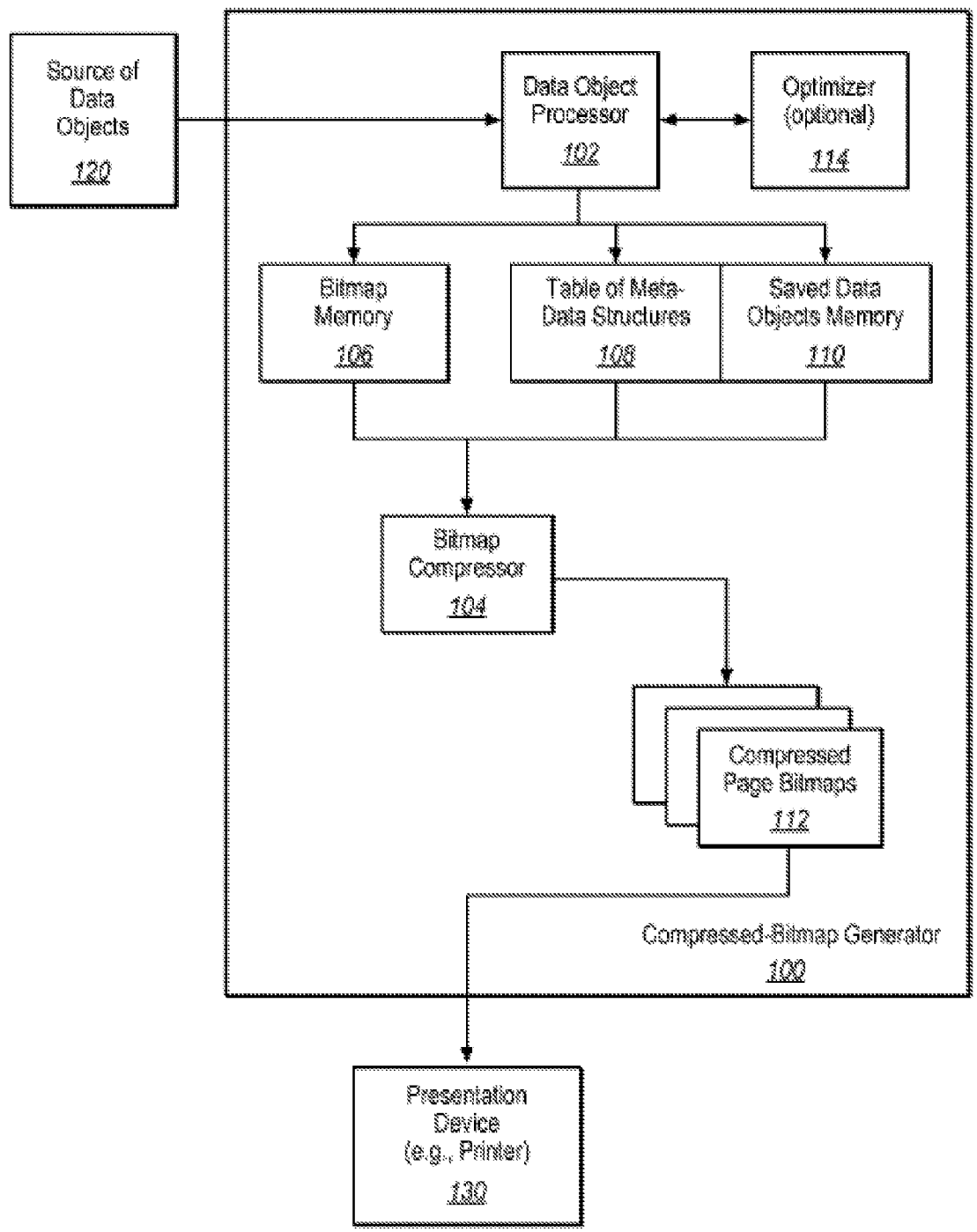
FIG. 1 is a block diagram illustrating one embodiment of a system that processes data objects to generate compressed bitmaps utilizing meta-data structures.

FIG. 1 is a block diagram of a system 100 for generating compressed bitmaps. A source of data objects 120 provides a sequence of data objects that represent a sheetside image. Data object processor 102 processes the sequence of data objects to generate a sheetside image represented in bitmap memory 106 and/or in a table of meta-data structures 108. Each sheetside image causes generation of a compressed page bitmap 112 by operation of the bitmap compressor 104.

Such a sequence of compressed page bitmaps 112 may represent a stored document or job to be transmitted to a presentation device 130. Presentation device 130 may be, for example, a printer and thus the sequence of compressed page bitmaps 112 may represent a print job or document to be printed by a printer.

Data object processor 102 processes the data objects representing information to be presented on a sheetside image. The data objects as received may be encoded in any of several well-known encoding standards such as page description languages and other document description standards. A data object may represent, for example, text or graphical information to be positioned within the sheetside image of the document. Thus, data object processor 102 is generally operable to process the data object by storing information derived from the data object in the bitmap memory 106 and/or in associated meta-data structures 108.

In one embodiment, data object processor 102 utilizes a table of meta-data structures 108 to reduce the need to write bitmap memory 106 for each data object and thus reduce utilization of memory bandwidth between data object processor 102 and bitmap memory 106. Reduced utilization of bitmap memory bandwidth improves efficiency of the generation of the corresponding compressed bitmaps by speeding the generation of the uncompressed sheetside image.

Specifically, data object processor 102 stores information relating to portions of bitmap memory 106 in corresponding entries of meta-data structure table 108. Processing of many data objects affecting portions of the bitmap memory 106 may be completed by simply updating information in corresponding entries of meta-data structure table 108. Other, or subsequent, data objects may require that the bitmap memory 106 be written in accordance with data represented by the data object.

Data object processor 102 therefore determines in processing each data object for the sheetside image whether portions of the data object must be written to portions of bitmap memory 106 or whether they may be compactly represented in corresponding meta-data structures within the table of meta-data structures 108 without requiring writing of portions of bitmap memory 106.

In one embodiment, a significant number of data objects may be represented by compact meta-data structures in table 108 and thus processor 102 may avoid the necessity of writing pixel by pixel information into bitmap memory 106. Some simple data objects such as those representing a solid color (e.g., a cleared bitmap or a solid color in a portion of the bitmap) may be represented in very compact form in meta-data structures of table 108 without requiring writing of any data in bitmap memory 106. Even more complex data objects such as a transparency masks or an opaque image may be represented compactly in a meta-data structure in table 108.

Processor 102 retains the received data objects in memory 110 and the meta-data structures may indirectly point to the saved data objects that are compactly represented thereby. Again with such a compact representation in the meta-data structure, data object processor 102 may reduce the volume of memory bandwidth utilization required to generate data objects.

Compressed-bitmap generator 100 also includes bitmap compressor 104 to generate compressed data representing a compressed page bitmap 112 following completion of the generation of a sheetside image by data object processor 102. When data object processor 102 has completed processing of a sequence of data objects representing a particular sheetside image, bitmap compressor 104 is operable to retrieve each meta-data structure and to generate compressed data in a compressed page bitmap 112 based on the information stored in the meta-data structure.

Where a meta-data structure provides sufficient information to generate a compressed representation of the corresponding portion of bitmap data, bitmap compressor 104 need not read bitmap memory 106 to generate a portion of the compressed page bitmap 112. Where the meta-data structure indicates that the corresponding portion of the bitmap contains the data to be compressed, bitmap compressor 104 reads the indicated portion of bitmap memory 106 to generate the corresponding portions of compressed page bitmaps 112.

Figure 2:
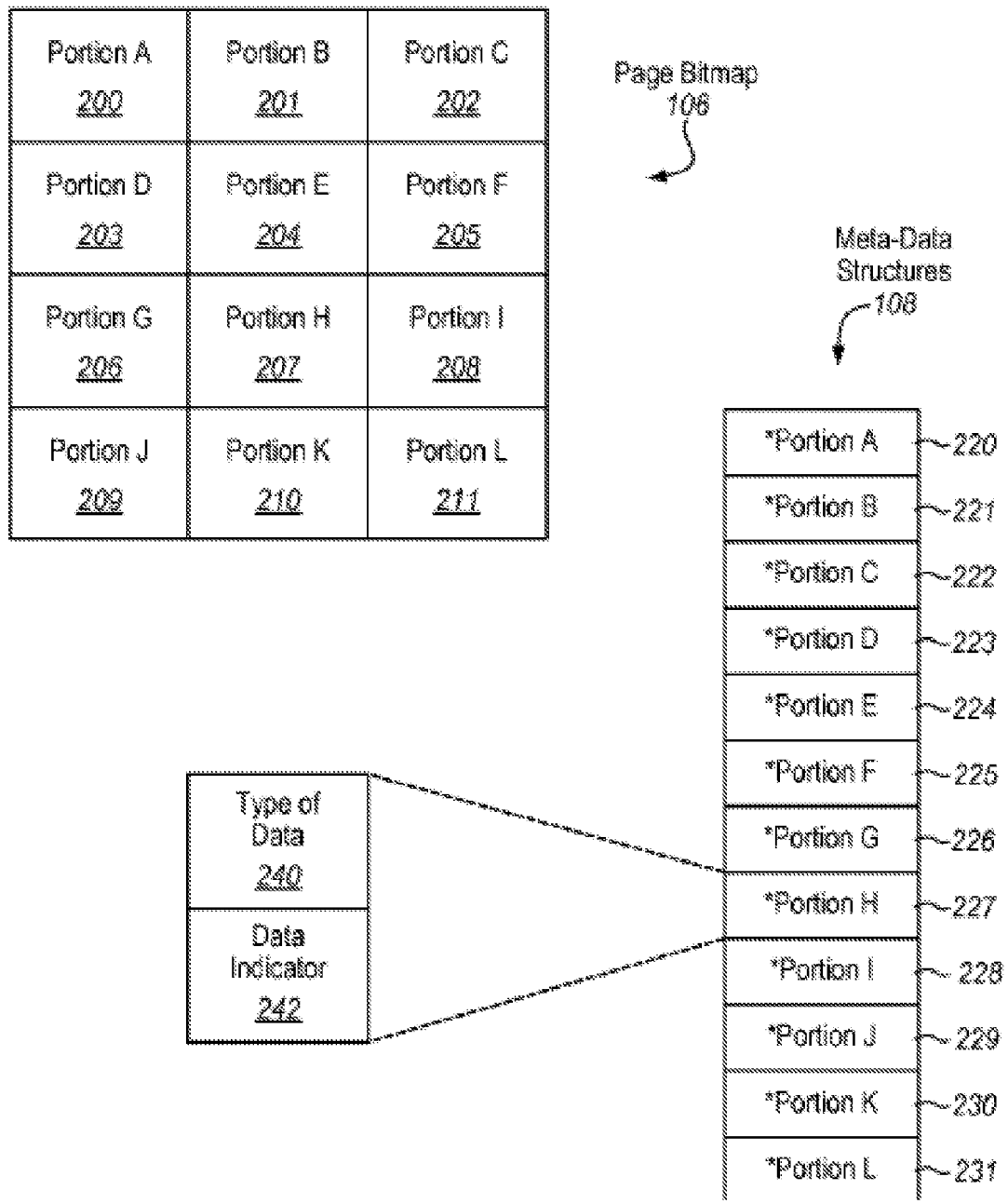
FIG. 2 is a block diagram illustrating one embodiment of a description of an association of each meta-data structure in a table of structures with a corresponding portion of the page bitmap memory.

FIG. 2 is a block diagram illustrating one embodiment of a relationship between a plurality of portions (or tiles) of a bitmap memory 106 and the table of meta-data structures 108. As shown in FIG. 2, bitmap memory 106 is logically subdivided into a plurality portions (or tiles) that may all be of equal size.

In one embodiment, bitmap 106 includes a plurality of identically sized, rectangular portions 200 through 211 ("Portion A" through "Portion L"). Each portion has a corresponding entry (220 through 231) in the table of meta-data structures 108. In particular, meta-data structure table 108 entry 220 ("*Portion A") includes information regarding the corresponding "Portion A" 200 of the bitmap memory 106. In like manner meta-data structure entry 221 ("*Portion B") corresponds to "Portion B" 201 of bitmap memory 106, etc.

Any suitable number of portions may be predefined in accordance with features and aspects hereof. Thus the number of such portions (200-211), the corresponding number of meta-data structures (221-231) in table 108, and the associated size of each of the portions may be predetermined and statically fixed within the system.

In one embodiment, each meta-data entry (220 through 231) includes a type of data field 240 and a data indicator field 242. The type of data field 240 indicates a type of data presently associated with the corresponding portion (200 through 211) of bitmap memory 106. Data indicator field 242 points (indirectly) at the saved data object that is presently associated with the portion corresponding to the meta-data structure. In a further embodiment, data indicator field 242 may directly encode the data of the data object presently associated with the portion.

Returning again to operation of data object processor 102 of FIG. 1, if the data derived from a data object were written to bitmap memory 106, the data may span one or more portions of the bitmap memory 106. As data object processor 102 processes data objects, for each portion of the bitmap memory 106 that would be affected by writing the data object, the corresponding meta-data structure in table 108 is updated to record information regarding the effect the data object would have on corresponding portions of the bitmap memory 106.

For example, if a data object would affect "Portion A" 200 and "Portion B" 201, data object processor 102 updates meta-data structures "*Portion A" 220 and "Portion B" 221. Depending on the particular new data object and the current data compactly represented by the meta-data structure of a portion of the bitmap, updating the meta-data structures 220 and 221 may suffice to represent the new data object without needing to write data into the bitmap memory portions 200 and 201.

In one embodiment, the type of data field 240 of a meta-data structure entry may indicate that the corresponding portion of the bitmap memory is a "compact" type of data or a "non-compact" type of data. A data indicator field 242 represents the data of the corresponding portion in a compact form.

Most generally, if the data that would be in a portion of the bitmap memory may be compactly represented in the meta-data structure without requiring that the data be written to the corresponding portion of the bitmap memory, then the type of data for the affected meta-data structure is "compact" and the data indicator field represents the new data for the corresponding portion of the bitmap memory If the data that would be in a portion cannot be compactly represented in the meta-data structure, the type of data for the affected meta-data structure is "non-compact" and the data object/objects are simply written to the corresponding portion of the bitmap memory. Those of ordinary skill will recognize that these particular "type of data" values ("compact" and "non-compact") are intended mere as exemplary.

More specifically, a "compact" type of data indicates that the data of the corresponding portion of the bitmap is compactly represented by the information in the meta-data structure and hence is not written in the corresponding portion of the bitmap memory. For example, the bitmap memory at the start of processing of a sheetside image is logically cleared (e.g., a solid white background often represented as zeros in the bitmap memory).

As data objects are processed for the sheetside image, portions of the bitmap and corresponding meta-data structures may be affected by the processed data objects. A "compact" type of data in the meta-data structure for such an affected portion of the bitmap then indicates that some data object has been processed that has affected the corresponding portion of the bitmap and that the affect on the corresponding portion is represented compactly in the meta-data structure by the data indicator field.

For example, the data indicator field may indirectly point to the data object in the saved data object memory. In another example, the data indicator field may directly represent that data object by an encoded value (such as the color of a rectangular data object that affects the corresponding portion of the bitmap memory). Hence, the portion of the bitmap memory corresponding to a meta-data structure having the "compact" data type has no relevant information written therein thus reducing bitmap memory bandwidth utilization that would be required to write the data objects to the bitmap memory.

A "non-compact" type of data indicates that the data of the corresponding portion of the bitmap cannot be compactly represented in a meta-data structure alone for any of various reasons (i.e., cannot be adequately represented by the data indicator field). In such a case, the data object or objects that affect the corresponding portion of the bitmap memory are simply written to the bitmap memory.

Numerous conditions may arise to preclude a "compact" type of data representation for a portion of the bitmap. Other conditions may arise where, as a matter of design choice, the portion could be represented by either a "compact" type of data or by a "non-compact" type of data in the corresponding meta-data structure. Based on cost/benefit implementation details for a particular application it may be determined that a "compact" representation is not desired.

For example, added computational complexity to compactly represent combinations of data objects overlapping within a portion may be too high although the particular overlapping data could be represented compactly. In another example, if image objects are a rarity in a particular application, there may be little benefit in compactly representing image data objects in a "compact" type of data meta-data structure.

In yet another example, where image objects are frequent and often overlapping in portions of the bitmap memory (e.g., a photo montage), significant benefits may be realized in assuring that portions with such overlapping image objects are compactly represented whenever possible to avoid using bitmap memory bandwidth to write image data that is likely to be overwritten by a later image data object. These and other heuristics and design choices will be readily apparent enhancements to the features and aspects hereof to optimize the systems and methods for particular applications.

According to one embodiment, an optional optimizer element 114 may be operable in system 100 to analyze the efficiency of the number and size of the portions for a particular set of data objects. Based upon such analysis, optimizer 114 may adjust the size and number of such portions and correspondingly adjust the number of meta-data structures in table 108. For certain types of documents or jobs, fewer such portions of larger size may provide optimal results in processing sheetside images.

In other types of documents or jobs, a larger number of smaller portions may provide optimal sheetside image processing. Where the portions are all of equal shape and size, the association between a meta-data structure (220 through 231) and its corresponding portion (200 through 211) of the bitmap memory 106 may be determined by a simple indexing calculation to associate the meta-data structure by its index position within the table 108 with its corresponding bitmap memory portion. Where the number, size, and/or shape of the bitmap portions are variable, each meta-data structure (220 through 231) may include suitable addressing information to identify its corresponding portion (200 through 211) of the bitmap memory.

Figure 3:
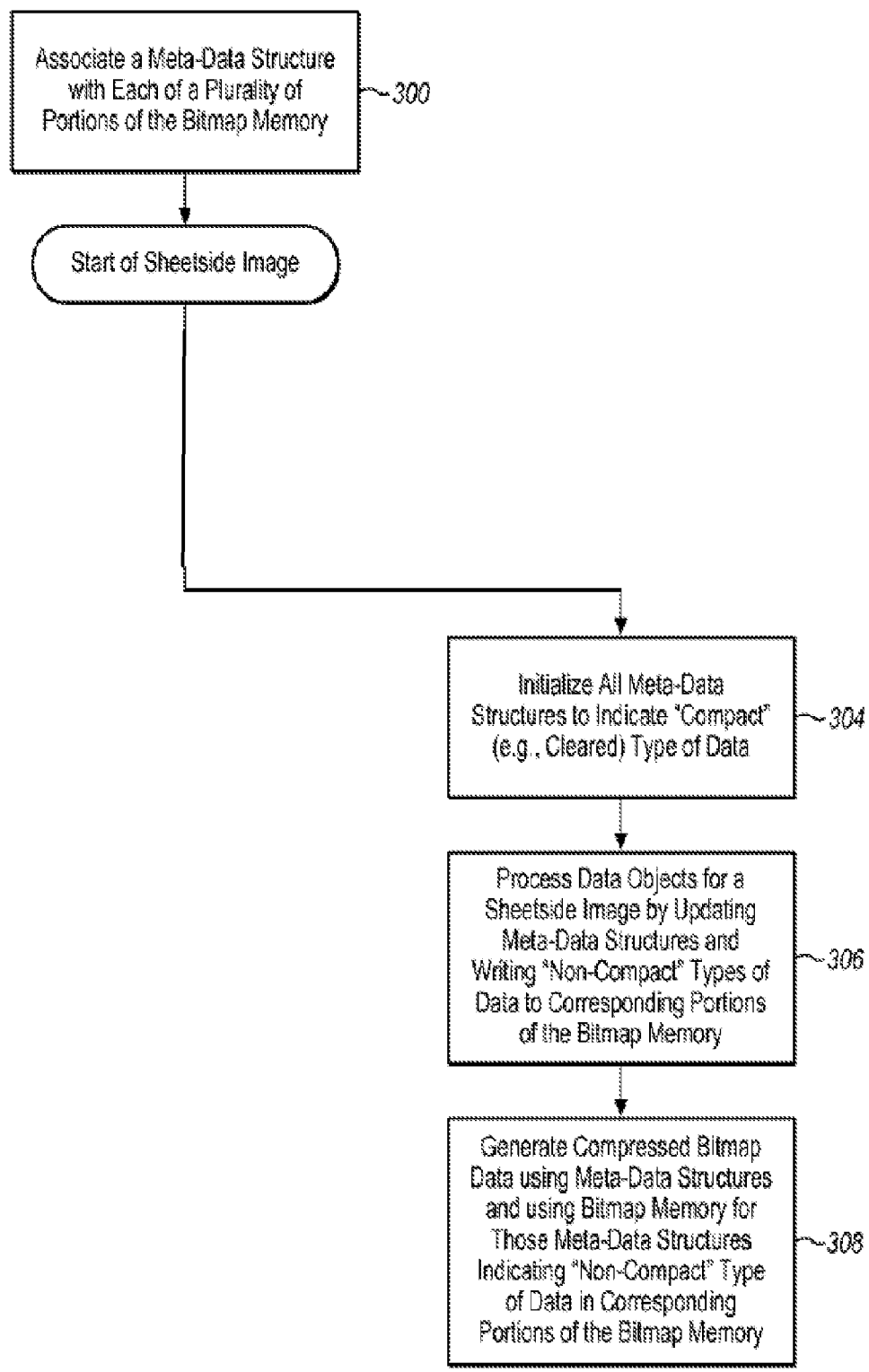
FIG. 3 is a flow diagram illustrating one embodiment of processing data objects representing a sheetside image utilizing meta-data structures.

FIG. 3 is a flow diagram illustrating one embodiment of processing data objects representing a sheetside image utilizing meta-data structures. Processing block 300 associates a meta-data structure with each of a plurality of portions of the bitmap memory. As noted above, the number of such portions, and hence the number of corresponding meta-data structures, may be statically predetermined or may be dynamically determined by optimization analysis in the processing of sheet side images. Processing block 300 therefore represents any suitable determination of an initial number of such portions and initialization of corresponding meta-data structures.

Prior to processing any data object, processing block 304 sets the type of data field of every meta-data structure to "compact" and the data indicator field is set to zero values (or other values representing a cleared state) to represent the cleared state of the bitmap memory at the start of generating a sheetside image (e.g., a "white" or "blank" sheetside image or a "cleared" sheetside image pre-set to a defined background color).

Processing of the sheetside image then continues to processing block 306 where the data object processor is operable to process the data objects corresponding to a sheetside image. The processing for each data object includes updating the meta-data structures for any corresponding portions of the bitmap that would be affected if data derived from the data object were to be written in the bitmap memory. The type of data field in each meta-data structure corresponding to an affected portion of the bitmap is updated to indicate the type of data now associated with the bitmap portion.

The data indicator field for each meta-data structure corresponding to an affected portion of the bitmap is also updated to represent the new data object that is associated with the corresponding portion of the bitmap. Exemplary details of the processing of processing block 306 for determining which portions of the bitmap memory may be affected by processing of the data object and associated processing to update corresponding meta-data structures are discussed further herein below. In general, the type of data field is updated to indicate changes in the corresponding affected portion of the bitmap from a "compact" type of data to a "non-compact" type of data.

Following completion of processing of the data objects for a sheetside image at processing block 306, processing block 308 represents processing of the bitmap compressor of system 100 to generate a compressed bitmap data representation of the sheetside image. The bitmap compressor uses each meta-data structure to determine from the type of data field whether the compressed data may be generated exclusively from the information in the meta-data structure (e.g., for "compact" types of data) or whether the compressed data must be generated by reading the data stored in the corresponding portion of the bitmap memory (e.g., for "non-compact" type of data). Thus, processing of the bitmap compressor in processing block 308 further reduces bitmap memory bandwidth utilization by avoiding the need to read bitmap memory for portions containing non-"non-compact" types of data.

Rather, for such "compact" types of data, the meta-data structure alone provides sufficient information for the bitmap compressor to generate compressed data representing the corresponding portion of the bitmap. Completion of the processing of processing blocks 304 through 308 thus generates a compressed bitmap representation of a sheetside image with reduced utilization of the bitmap memory bandwidth.

Figure 4:
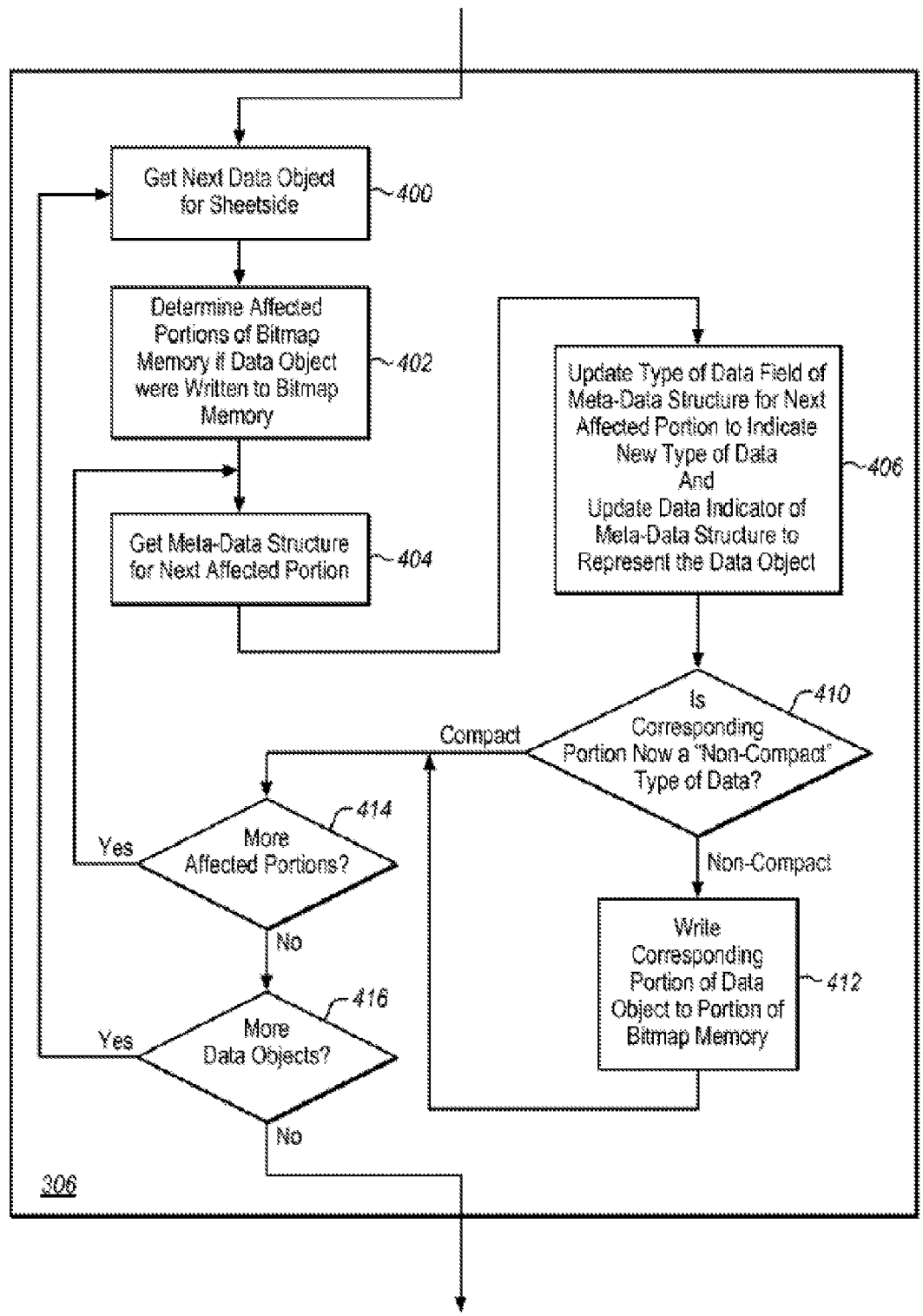
FIG. 4 is a flow diagram illustrating one embodiment of processing data objects for a sheetside.

FIG. 4 is a flow diagram illustrating one embodiment of processing data objects for a sheetside. Processing block 400 gets the next (or first) data object for the sheetside image to be generated. Processing block 402 then determines which portions of the bitmap memory would be affected by the data object if the data object were written to the bitmap memory by standard bitmap processing techniques. The portions affected may be determined by comparing geometric parameters of the object (e.g., bounding box dimensions and position of the object on the bitmap) with the dimensions of the various portions. For each portion of the bitmap that would be affected by the data object, processing blocks 404 through 414 are repeated.

Processing block 404 gets the next (first) meta-data structure corresponding to a next affected portion of the bitmap. Processing block 406 then updates the type of data field of the meta-data structure to indicate any change to the field in accordance with the particular data object. In addition, processing block 406 updates the data indicator of the meta-data structure to represent the data object being processed if the object is to be compactly represented in the meta-data structure.

Exemplary additional details of processing block 406 are discussed further herein below. In general, the data type field of the meta-data structure is updated to indicate "compact" if the effect of the data object on the corresponding portion of the bitmap memory will be compactly represented by the meta-data structure fields (in combination with the saved data object represented by the data indicator field).

If the effect on the portion will not be compactly represented by the meta-data structure, the type of data field is updated to indicate a "non-compact" type of data and the effect of the data object is actually written to the corresponding portion of the bitmap (processing block 412 below). For example, overlaying certain data objects by other data objects may not be compactly represented (in some cases) and hence the data object is simply written to the corresponding affected portion of the bitmap memory. However, before the data object is written into the corresponding affected portion of the bitmap memory, if there are previous objects that are to remain visible in that portion, the compact data is first written into the portion to initialize the memory to the prior object(s).

Alternatively, as a matter of design choice certain objects or combinations of objects may be written to the bitmap for optimization consideration in a particular application. In other embodiments, portions or edges of a data object may cover only part of a portion of the bitmap. Again, as a matter of design choice such partial coverage of a portion by an object may or may not be represented by the corresponding meta-data structure.

These and other heuristic decisions may be employed within the processing of processing block 406 to determine in what conditions the affected portion can be and will be represented compactly by the meta-data structure. Thus in processing block 406, a determination is made as to whether it is possible to compactly represent the affected portion and whether it is desirable to do so in a particular application.

Processing block 410 determines whether the meta-data structure type of data field has been updated to indicate a "non-compact" type of data. If so, processing block 412 writes the corresponding portion of the bitmap memory with the rasterized data derived from the data object. In either case, processing continues at processing block 414 to determine whether additional affected portions remain to be processed.

If so, processing continues looping back to processing block 404 to process meta-data structures corresponding to other affected portions and processing of this data object. If not, processing block 416 next determines whether additional data objects remain to be processed for this sheetside image. If so, processing continues looping back to processing block 400 to retrieve and process a next data object for the current sheetside image. Otherwise processing of this sheetside image is completed.

In one embodiment, updating the meta-data structure, as referred to in processing block 406 comprises determining whether the affected portion will be compactly represented by the corresponding meta-data structure. As noted above, this determination may entail determining not only whether the affected portion can be represented compactly but also determining whether it is desirable to do so based on design choices in the implementation of features and aspects hereof.

For example, it may be possible to compactly represent a portion of a bitmap even if the data object affects only part of the portion of the bitmap. Additionally, it may be possible to compactly represent a portion of a bitmap even if multiple objects overlay one another in particular ways within the affected portion.

If the new object cannot be compactly represented by the meta-data structure, it is next determined whether the meta-data structure presently indicates that the corresponding portion is already written with data from one or more prior objects (e.g., already indicates a "non-compact" type of data in the meta-data structure). If so, processing is complete. Otherwise the type of data is changed to "non-compact" and all previously represented data objects to the affected portion of the bitmap is written Specifically, the data that is represented by the present meta-data structure is written to the corresponding portion of the bitmap memory. In other words, the currently represented "compact" type of data object/objects represented in the meta-data structure is/are written to the corresponding portion of the bitmap memory.

Since these previously processed objects have not yet been written to the bitmap, they must be written to the affected portion before the data derived from the new data object is written in the affected portion. Subsequently, the type of data is set to "non-compact" to complete processing of this meta-data structure and corresponding bitmap portion affected by the new data object.

If it is determined that the present meta-data structure indicates that the new object can be compactly represented by the meta-data structure (and if it is determined to be desirable as a matter of design choice), it is next determined whether the new object will affect a change of the affected portion. For example, if the meta-data structure indicates a "compact" type of data that indicates a solid color is represented and if the new data object does not change that color (e.g., because it is the same color or transparent), then the new object would not change the portion and processing is complete.

If it is determined that the data object changes the meta-data representation of the corresponding portion, the type of data field is updated (or set) to indicate a "compact" type of data and the data indicator field is set to represent the new data object (e.g., indirectly point to the saved data object or otherwise directly encode the data object in the data indicator field). Processing of this meta-data structure corresponding to an affected portion of the bitmap is then complete.

In one embodiment, an effect a data object may have on one or more portions of the bitmap that it overlays depends on the particular semantic of the data object. Any of a variety of data objects may be encountered depending upon design choices in implementation of features and aspects hereof. In general all objects may be considered as a collection of pixels—each pixel having some value indicating a color and/or indicating a transparency value.

In general, all objects are represented as a 2-dimensional array of such pixel values (e.g., a rectangular bounding box of pixel values). The value of a pixel may be encoded in a number of manners. For example, full color data objects may be defined as a pixel intensity value for each of three primary color planes and the color black. In another example, each pixel may simply encode an index value into a table of pre-defined colors (e.g., a palette). Further, each pixel value may encode a transparency level indicating that the pixel is transparent (i.e., has no color—no effect on the bitmap) or has some opaque color value (with the color specified by the value as indicated above).

Features and aspects hereof may be used with any and all such data object encodings and shapes. In one embodiment, data objects may be classified in one of four broad categories: rectangle, transparency mask, palette, and image with possible transparency and/or translucency.

A "rectangle" is any data object that represents a rectangular area where the pixels of the rectangular area each represent a specified opaque color. Thus, a rectangle object is typically defined by its geometric dimensions and a single color value. A rectangle may thus be compactly represented in a portion of the bitmap by a corresponding meta-data structure as a "compact" type of data where the data indicator field either points to the saved data object or encodes the dimensions and color of the rectangle.

A "transparency mask" is any data object (typically also rectangular in shape though not necessarily) where each pixel of the mask is either a "transparent" bit or an "opaque" bit of some specified color. This kind of data object is also sometimes referred to as a "bi-level image". Text is often represented as such a transparency mask. The glyph representing a character code or a sequence of such glyphs are represented as opaque pixels (all of the same color) against a bounding box background of transparent bits that do not affect the bitmap memory. When writing such a transparency mask to bitmap memory, the opaque pixels are written to the bitmap memory and the transparent pixels have no effect such that whatever was previously in the corresponding pixel locations of the bitmap memory remains unchanged. Typically the transparency mask is defined as a rectangular area with the transparent and opaque pixels defined therein. A transparency mask may thus be compactly represented in a portion of the bitmap by a corresponding meta-data structure as a "compact" type of data where the data indicator field points to the saved data object.

A "palette" is any data object that defines a shape (often a rectangular area) filled with one or more colors where the colors are selected from a limited set of colors (a palette). Thus, the colors are specified as index values in the relatively small range of palette values. In one embodiment of such a palette object, one palette color index value is reserved to represent a "transparent pixel" and all other palette color index values represent other corresponding colors in the palette. A palette data object may thus be compactly represented in a portion of the bitmap by a corresponding meta-data structure as a "compact" type of data where the data indicator field points to the saved data object.

An "image" data object is any object where each pixel has a pixel value in a color spectrum. Photographic images are exemplary of such an image object. An image is typically defined as a rectangular area of such pixel values. An image may thus be compactly represented in a portion of the bitmap by a corresponding meta-data structure as a "compact" type of data where the data indicator field points to the saved data object. Further, the pixels of an image object may be compressed and encoded according to a number of well known standards such as LZW and JPEG standards.

When data objects of these exemplary types are associated with portions by means of positioning the data object on a sheetside, the data object can be represented by a series of portions aligned with the portions of the underlying sheetside. Some affected portions of the bitmap memory are completely filled and some are only partially filled depending on the position of the data object on the sheetside. For example, a rectangle data object may include portions only partially affected by the data object at a boundary of the rectangle (i.e., showing the edges of the rectangle) and solid portions (i.e., the center areas, completely filled by the rectangle). Similarly, other types of objects (e.g., image data objects, transparency mask data objects, and palette data objects) may affect portions of the bitmap differently where the object completely fills a portion versus portions that are only partially affected by the data object at a boundary edge of the object. As noted above, such portions that are only partially affected by processing of a data object may nonetheless be compactly represented by the meta-data structure for that portion.

As data objects are processed to update meta-data structures corresponding to affected portions of the bitmap memory, combinations of data objects of the above types may be processed within any single affected portion (e.g., a sequence of objects may each affect a common portion each object overwriting or in some way adding to the pixels of the portion).

In one embodiment, the specific effect on a portion of the bitmap from processing a data object depends, in part, on the present type of data associated with the portion as indicated in the corresponding meta-data structure. In general, if an affected portion presently indicates a "compact" type of data in its corresponding meta-data structure, a next data object processed that completely fills the portion will typically retain the "compact" type of data but update the data indicator to represent the new object.

If the new object only partially covers the portion that is currently compactly represented by a corresponding meta-data structure, then the type of data may be changed to "non-compact" to represent the mixture of the effects of the prior data object mixed with the partial effect of the new data object.

If a "transparency mask" object is processed, its effect on any portion currently represented by a "compact" type of data meta-structure may depend on what the prior data object was. As can be seen from the above few examples, a variety of objects and combinations of objects may be represented compactly in the meta-data structure for an affected portion while other combinations of objects affecting a portion may require non-compact representation by writing to the bitmap memory portion.

As discussed above, bitmap compressor 104 generates a compressed representation of a sheetside image using the meta-data structures. In such an embodiment, the compressed data may be generated by stepping through each horizontal line across the bitmap memory (e.g., each scanline) and generating compressed data from the meta-data structures that intersect each scanline.

In a further embodiment, compressed data is generated according to a PackBits compression scheme (e.g., Pack-Bits) for run-length encoding of the bitmap data. PackBits compresses raw data by looking for repeated strings having the same 8-bit value. A control byte is used to indicate repeat (negative values) or pass-thru (positive values) data. The absolute value of the control byte is the number of repeated or passed-thru values decremented by 1.

For instance, values 0 thru 127 indicate that 1 thru 128 passed-thru values will follow the control byte, while values −1 thru −127 indicate that the following value is repeated for a total of 2 thru 128 times. The value −128 is not defined, and thus may be used in non-standard ways. In one embodiment, 3 or more identical 8-bit data values are coded as a repeat sequence (e.g., 0 0 0 raw 8-bit data is coded as −2 0). Further, a string of non-identical data values is coded as a pass-thru (or literal) string (e.g., 21 22 23 24 raw data is coded as 3 21 22 23 24).

After a sheetside is compressed, the bitmap data is later processed for printing. Specifically, the data may be retrieved, decompressed and processed for printing. For instance, processing may involve converting the bitmap to a size commensurate with a printing bitmap. Also, additional bitmaps (e.g., N-up) or other data ((e.g., header/footer, watermark, etc.) may need to be added and/or overlaid.

In conventional processes, decompressing and re-compressing the data requires data in the PackBits format to be converted to image data, and subsequently back to the PackBits format. Such a process is inefficient in the use of memory, as well as in the time incurred for the PackBits decompression and compression.

According to one embodiment, retrieved PackBits data is left in that format and used in the generation of the subsequent sheetside generation, thus eliminating the compression and decompression times. In such an embodiment, a new object classification is introduced such that the broad categories now includes a PackBits object type, in addition to the rectangle, transparency mask, palette and image classifications discussed above. In a further embodiment, a PackBits object location is saved as rectangle data, where the background color is solid and a PackBits "color" refers to a similar offset of PackBits data. Moreover, transparency (and possibly translucency) data may be stored with PackBits data to allow blending and bleed through, where transparent areas show only solid background color. Non-solid backgrounds (e.g., previous tile state) typically cause non-compact tiles if transparency is active or are not affected if the entire tile area is being overlaid with a completely transparent area.

Further, a tile having a PackBits object is processed according to the above-described mechanism such that a PackBits display item is found from a data indicator 242 pointer in the meta-data structure, and PackBits display items combined with other object types other than color create non-compact portions. Accordingly, the processing of tiles with PackBits objects is handled according to the "compact" and "non-compact" indications in the meta-data structures discussed above with reference to FIG. 4.

For example, when a PackBits object is retrieved for a sheetside image, a determination is made as to which portions of the bitmap memory affected by the PackBits object, a corresponding meta-data structure to a next affected portion of the bitmap is retrieved, the type of data field of the meta-data structure is updated to indicate a change to the field and to represent the data object being processed if the object is to be compactly represented in the meta-data structure. Thus, the effect of PackBits object processing is that data is pulled from referenced PackBits data upon encountering a PackBits tile during a subsequent bitmap processing and prior to recompression for printing.

Subsequently, the sheetside image is compressed according to processing block 308 discussed above with reference to FIG. 3. However, during compression of the sheetside image, data from PackBits objects may be simply realigned and inserted into the corresponding bitmap without compression since the objects are already in a compressed format. For instance, tiles exclusively including PackBits objects are inserted into the bitmap without decompression or further compression, while tiles mixed with PackBits objects and other objects may require additional decompression and recompression.

Rotation and Clipping

Polygon clipping provides a method to selectively enable or disable rendering operations within a defined region of interest. A rendering algorithm draws only pixels in the intersection between a clip region and a scene model. Lines and surfaces outside the view volume are removed. A clip polygon is a two-dimensional (2D) region of interest from a source image. After being clipped, the rendering operation may require that the polygon be rotated. However, the clipping and rotating of polygons typically require a high magnitude of processing computations, especially considering an application of a bilinear filtering and/or the involvement of large image sizes.

Figure 5:
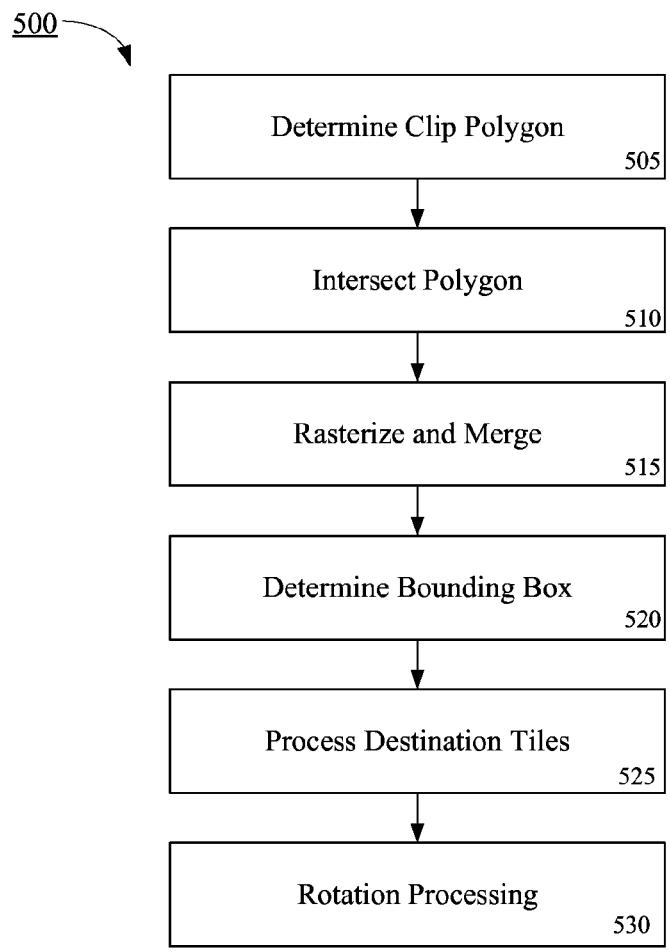
FIG. 5 is a flow diagram illustrating one embodiment of performing rotation and clipping.

According to one embodiment, polygons are rotated and clipped by independently processing each memory tile of an image. In such an embodiment, multiple threads are implemented for parallel processing of the tiles. FIG. 5 is a flow diagram illustrating one embodiment of a process 500 for processing and rotation of a polygon. Process 500 may be performed by processing logic that may comprise hardware (e.g., circuitry, dedicated logic, programmable logic, etc.), software (such as instructions run on a processing device), or a combination thereof. Process 500 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-4 may not be discussed or repeated here.

At processing block 505, destination coordinates of a clip polygon are determined. In one embodiment, the destination coordinates of the clip polygon are determined by applying a transformation to the source image. In another embodiment, the transformation is a two-dimensional (2D) affine transformation. This defines the set of destination tiles that are going to be affected by the source image. At processing block 510, the clip polygon is intersected with a source image. At processing block 515, the clip polygon is rasterized and merged with raster transparency and alpha masks into a single alpha mask corresponding to a source raster image. A transparency mask specifies fully transparent pixels, while an alpha mask specifies the level of translucency for the corresponding pixels in the source image. The source image is the image that will subsequently be rotated and used to composite rotated raster pels with the raster bitmap for the sheetside. The raster bitmap for the sheetside is also known as a sidemap.

At processing block 520, a bounding box is determined. In one embodiment, the bounding box is a section of a destination sidemap at which the transformed raster pels are to be rendered. Subsequently, the bounding box in the destination is divided into logical tiles. In such an embodiment, each tile is divided according to a configurable width/height.

Figure 6:
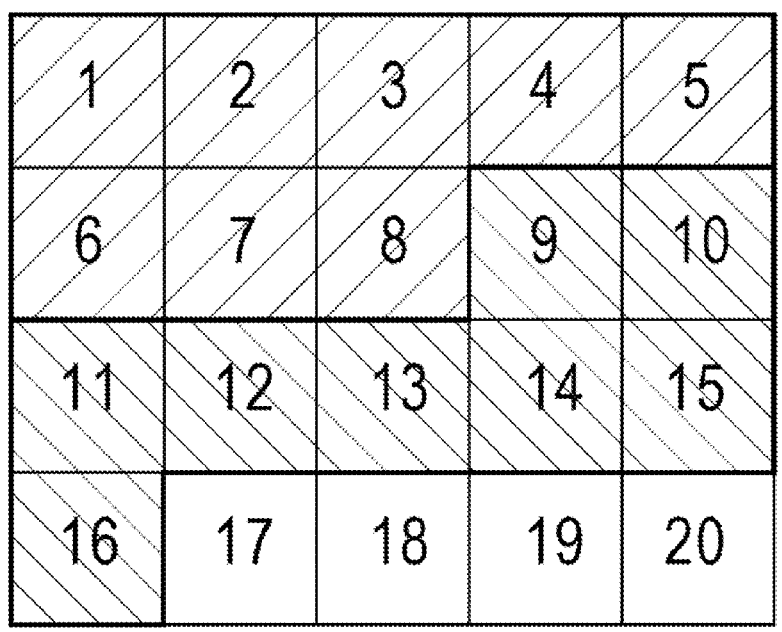
FIG. 6 illustrates one embodiment of destination sidemap including logical tiles.

FIG. 6 illustrates one embodiment of destination sidemap including logical tiles. In some embodiments, the dynamically configurable logical tiles may be snapped to fixed sheetside tiles of the printing bitmap. As discussed above, the tiles are processed independently by multiple processing threads. As shown in FIG. 6, a first batch of tiles (e.g., 1-8) may be processed at a first thread, while second (e.g., 9-16) and third batches (e.g., 17-20) of tiles are processed by second and third threads, respectively. In one embodiment, an automatic load balancing mechanism is implemented to process the tiles.

Referring back to FIG. 5, a destination tile is processed for each thread iteration in order to determine corresponding raster/source tile coordinates, processing block 525. According to one embodiment, an inverse transformation is implemented to determine the source tile coordinates. In such an embodiment, the inverse transformation is applied incrementally. For instance, since the (start_u, start_v) position of the (0, 0) coordinate of the destination bounding box is known, (h_du, h_dv) increments are obtained when moving horizontally one pel in the destination image (e.g., when moving one scanline down, the corresponding offset in the source image is (v_du=−h_dv, v_dv=h_du) since the two rotated vectors are orthogonal). In a further embodiment, 32-bit floating point integers are used for the source coordinates.

Figure 7:
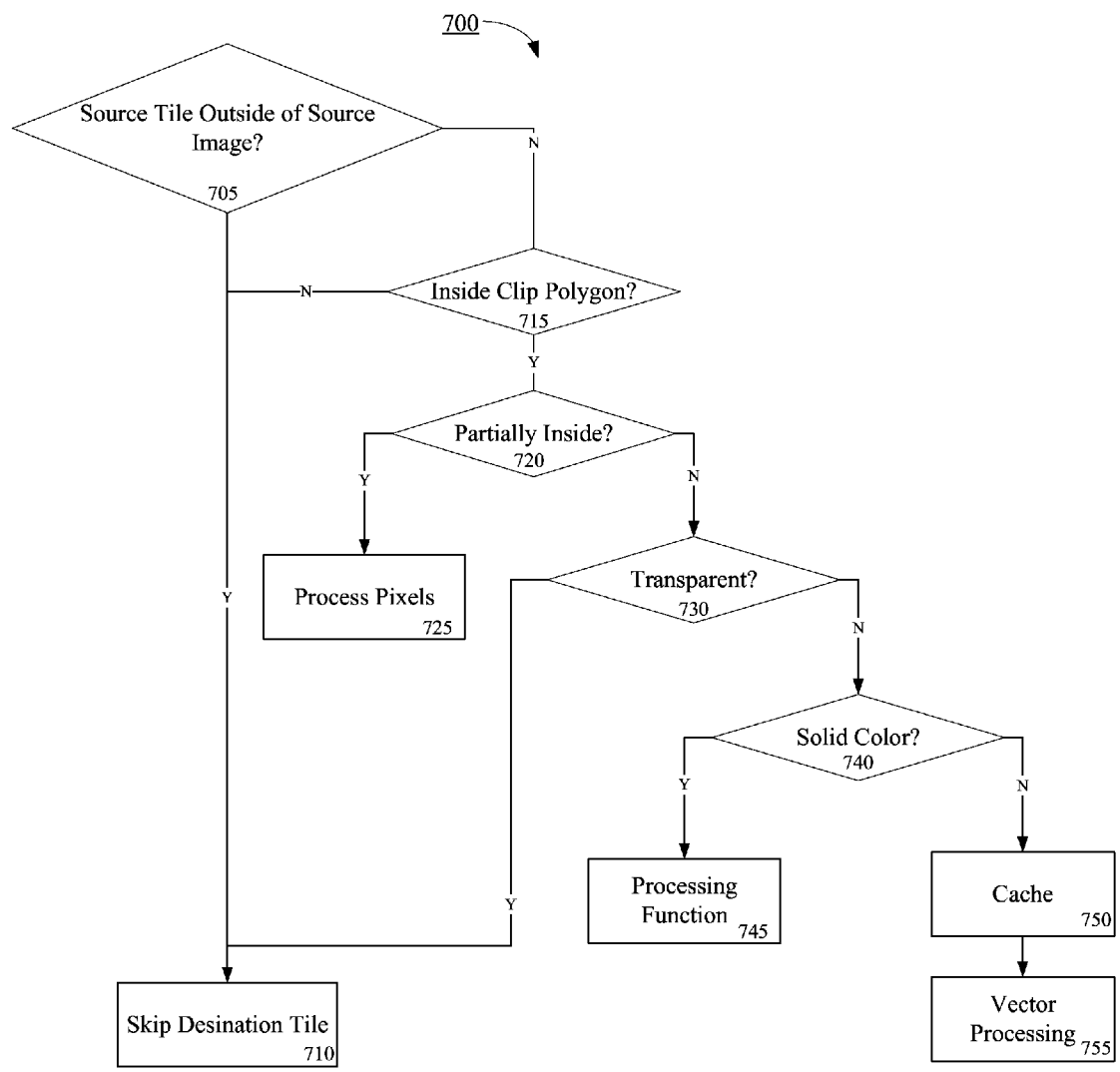
FIG. 7 is a flow diagram illustrating one embodiment of rotation processing.

At processing block 530, rotation processing is performed on the source tiles. FIG. 7 is a flow diagram illustrating one embodiment of process 700 for performing rotation processing. Process 700 may be performed by processing logic that may comprise hardware (e.g., circuitry, dedicated logic, programmable logic, etc.), software (such as instructions run on a processing device), or a combination thereof. Process 700 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-6 may not be discussed or repeated here.

Figure 8:
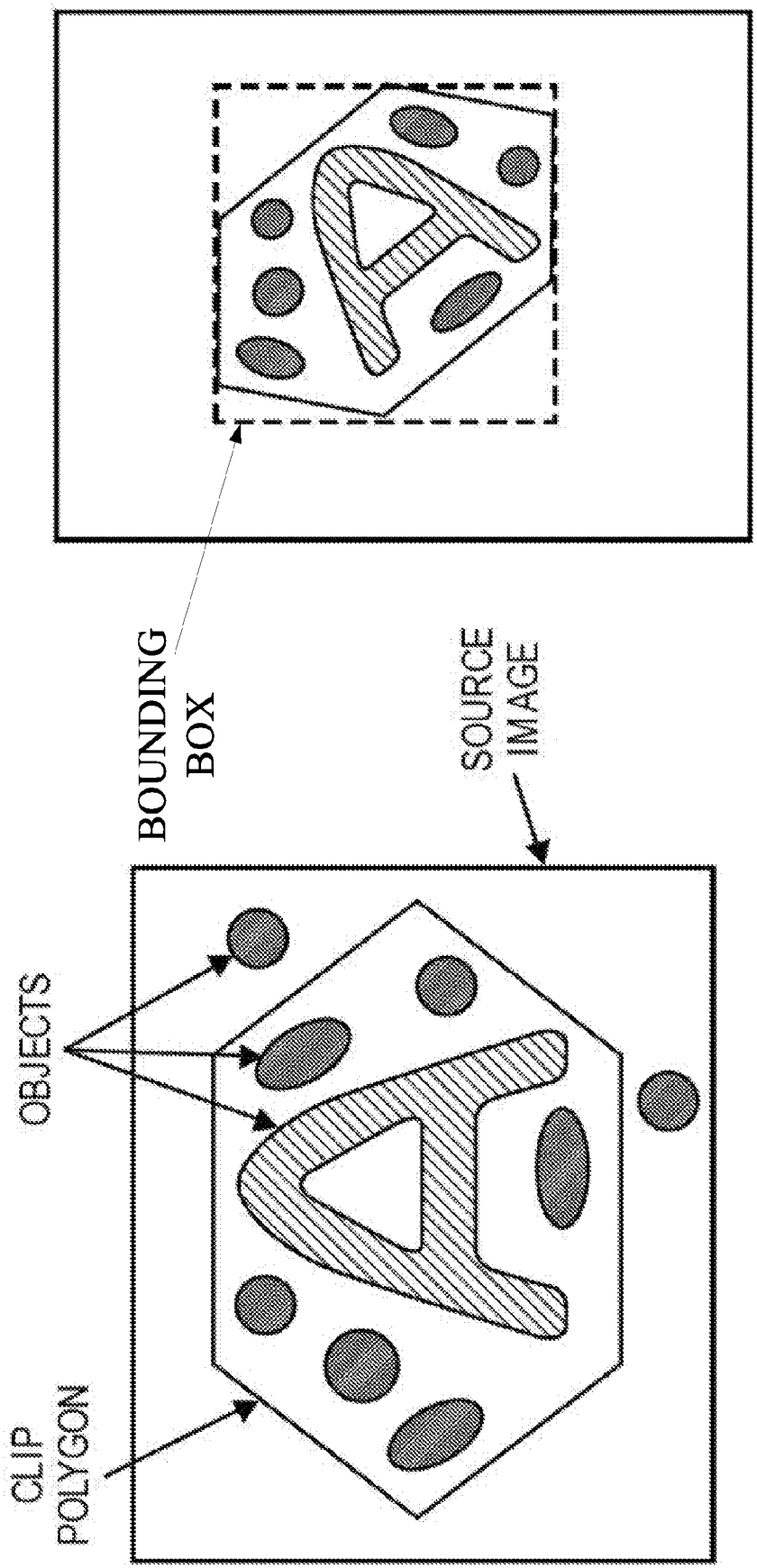
FIG. 8 illustrates one embodiment of an image.

At decision block 705, a determination is made, for each source tile, as to whether the tile is mapped to the area outside of the source image. FIG. 8 illustrates one embodiment of a source image to be rotated (at left), as well as the rotated image. As shown in FIG. 8, a pre-rotated source image includes objects that are inside and outside of a clip polygon. The rotated image includes the rotated clip polygon and objects within the clip polygon. However, objects outside of the clip polygon have been skipped.

Figure 9A:
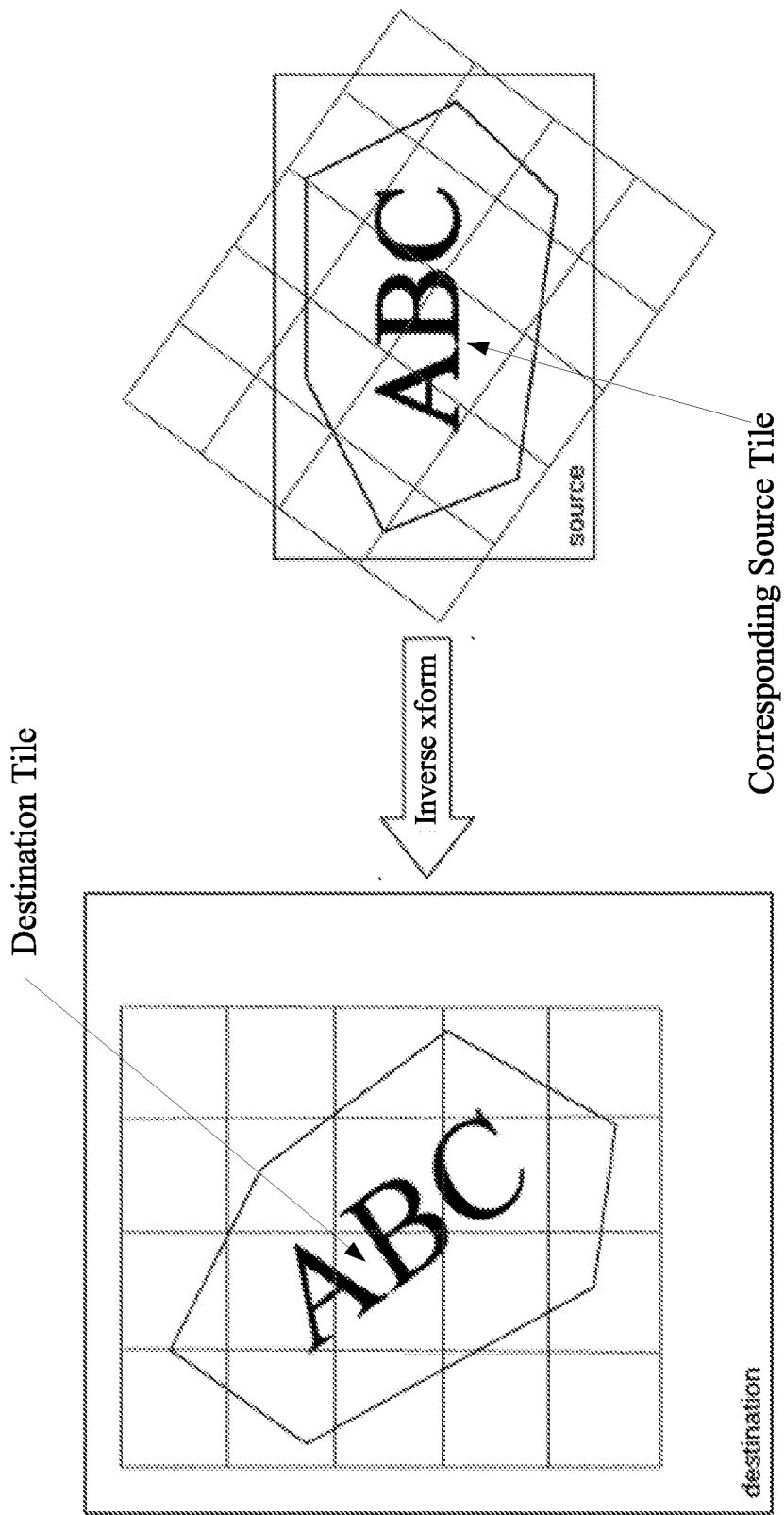
FIG. 9A illustrates one embodiment of an inverse transform process for an image.
Figure 9B:
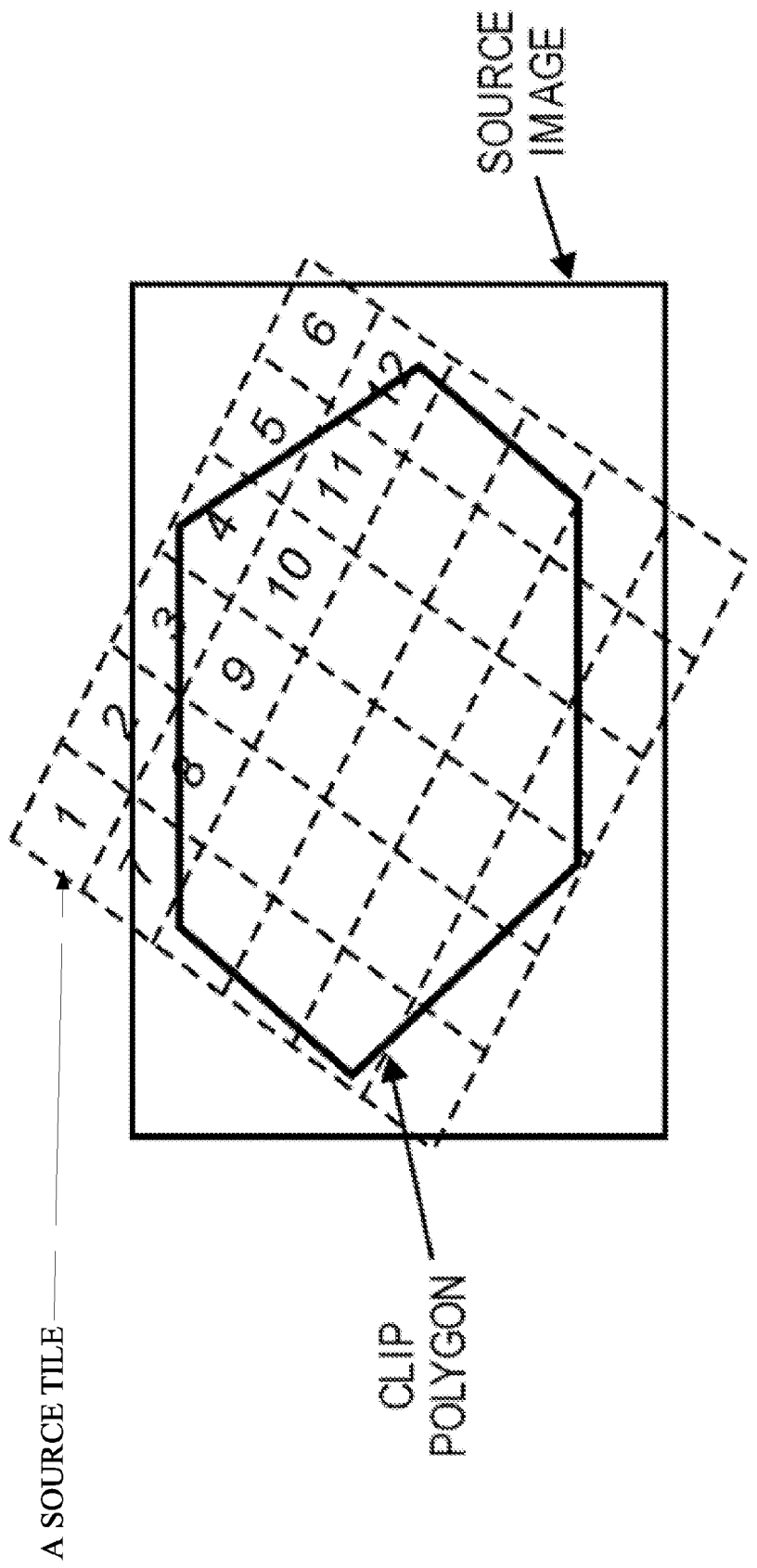
FIG. 9B illustrates one embodiment of a source image and clip polygon.

FIG. 9A illustrates one embodiment of the source image rotation discussed with reference to FIG. 8 implementing an inverse transform application to memory tiles in order to obtain the destination image. As shown in FIG. 9A, the area on the source image that corresponds to the destination tile is called a source tile. Referring back to FIG. 7, if a source tile is determined to be mapped outside of the source image (processing block 705) the destination tile is skipped (processing block 710) since there is no data outside the source image. FIG. 9B illustrates one embodiment of the source tiles with reference to the source image and clip polygon. As shown in FIG. 9B, tile 1 is outside of the source image. Thus, tile 1 is skipped because the tile would not be included in the clip polygon.

Referring again to FIG. 7, if at decision block 705 the source tile is determined to be within the source image, a determination is made as to whether the source tile is within the clip polygon, decision block 715. If not within the clip polygon, the destination tile is skipped, processing block 710. As shown in FIG. 9B, tile 6 is inside of the source image, but outside of the clip polygon. Thus, similar to tile 1, tile 6 is skipped because it is not within the polygon.

If at decision block 715 the source tile is determined to be within the clip polygon, a determination is made as to whether the source tile is only partially within the clip polygon, decision block 720. If the tile is only partially within the clip polygon, rotation processing is performed on each pel within the source tile, processing block 725. As shown in FIG. 9B, tile 3 has a portion inside the clip polygon, while another portion is outside of the source image. In this instance, each pel must be processed to determine which pels are inside the clip polygon. The pixels in tile 3 internal to the clip polygon are rotated.

If at decision block 720 the source tile in the bounding box (bbox) is determined to be fully within the clip polygon, a determination is made as to whether the source tile is transparent, decision block 730. If so, the destination tile may be ignored (or skipped), processing block 710. Otherwise, a determination is made as to whether the source tile is a solid color, decision block 740. In one embodiment, this is determined by simply verifying that all the pels in the source tile bounding box have the same value as that indicates a solid color. No copying is done to the cache memory if the condition is met. If the source tile is a solid color, the source tile is processed via a function, processing block 745, that avoids rotation or bilinear interpolation.

According to one embodiment, a subsequent determination may be made as to whether the solid tile is opaque or translucent. If the tile is opaque solid, all of its pels overwrite the destination pels. If the destination tiles were snapped to the sheetside tiles, this would be done by simply modifying the table of metadata structures 109. Further, if the source tile is translucent (e.g., between transparent and opaque) solid, an alpha-blending operation may be performed between the filtered source pels and the destination pels (e.g., in the sheetside). Alpha-blending is a means to mix a translucent color value atop a previous color value, incorporating printer defined mixing rules. A filtered source pel is a foreground value used for alpha-blending, which is determined by bilinear filtering corresponding 2×2 source pels. In one embodiment, transparency/opacity of a tile is determined by the tile's value of corresponding pels from the combined alpha mask.

If the source image area of the bounded box is a translucent solid color (e.g., not transparent or opaque), the rotation of the source image area is performed by setting (e.g., alpha-blending) all pels in the corresponding destination tile to/with the translucent solid color of the source image area. If at decision block 740, the source image area is determined to be of non-uniform color or non-uniform translucency or non-uniform transparency (in other words, it is not solid), the source image area is copied to a cache, processing block 750. In one embodiment, the cache includes an appropriately-sized cache line to process each source image area bounded box, and is offset so that the calculations are performed on source coordinates. In one embodiment, the size of a cached tile scanline is fixed, and determined for a worst-case of 45-degrees rotation once the destination tile size is set.

Once the source pel values are copied to the cache memory, they reside in a 2D image having a distance of 'cache_stride' bytes between two consecutive scanlines. In an 8-bpp row-major image, the address of a particular (x,y) pel of the image is determined as img_pel_addr(x, y)= (img_addr+y*img_stride+x). At this point the (x,y) values are in source coordinates and may be used to address into the cache memory using the same simple calculation as in img_pel_addr(x,y). Concretely, a computation is performed once per tile the following: offset_addr=cache_addr− srcBBox.ymin*cache_stride−srcBBox.xmin. Subsequently, the formula cache_pel_addr(x, y)=offset_addr+ (y*cache_stride)+x is used to obtain the address of the (x,y) pel in the cache memory. Moreover, if cache_stride is a power of 2 constant (say) 128, a left bit shift may be used instead of the multiplication to obtain the efficient expression offset_addr[(y<<7)+x] for getting to the cache_pel[x, y] value.

At processing block 755, the rotation of the source image area is processed via the cache. In one embodiment, this rotation is also performed via bilinear interpolation. In such an embodiment, a source value is determined for each destination pel by applying the inverse transformation to obtain floating-point source coordinates and perform a bilinear interpolation on the closest four neighbors with discrete coordinates. In a further embodiment, the cache includes a padded width that is a multiple of 2 to enable implementation of shift operations instead of multiplications when linearizing the (u,v) addresses. In yet a further embodiment, it is not necessary to check for the bounds of reads from the cache.

Figure 10A:
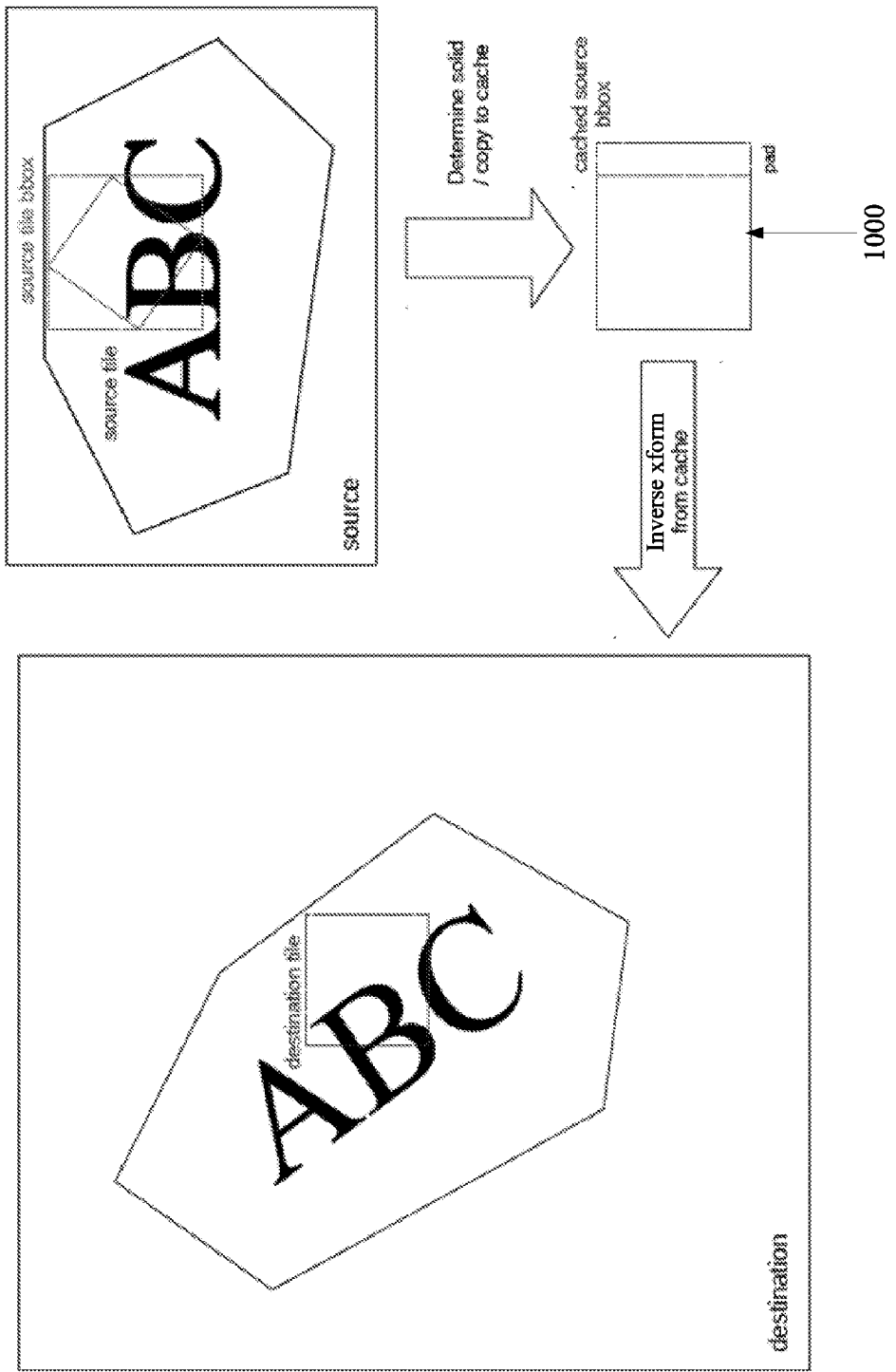
FIG. 10A illustrates one embodiment of source tile caching.
Figure 10B:
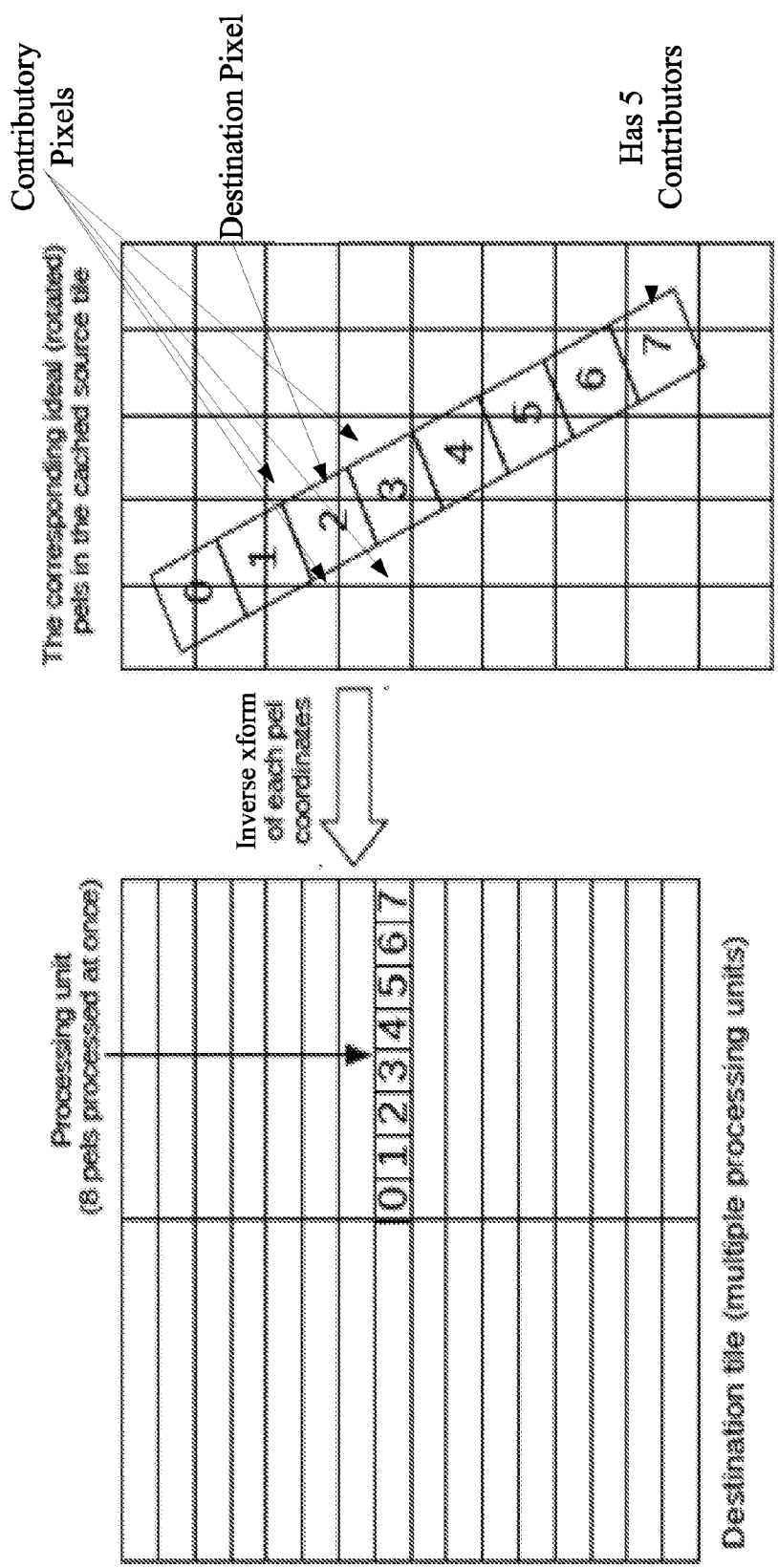
FIGS. 10B and 10C illustrate one embodiment of bilinear filtering.
Figure 10C:
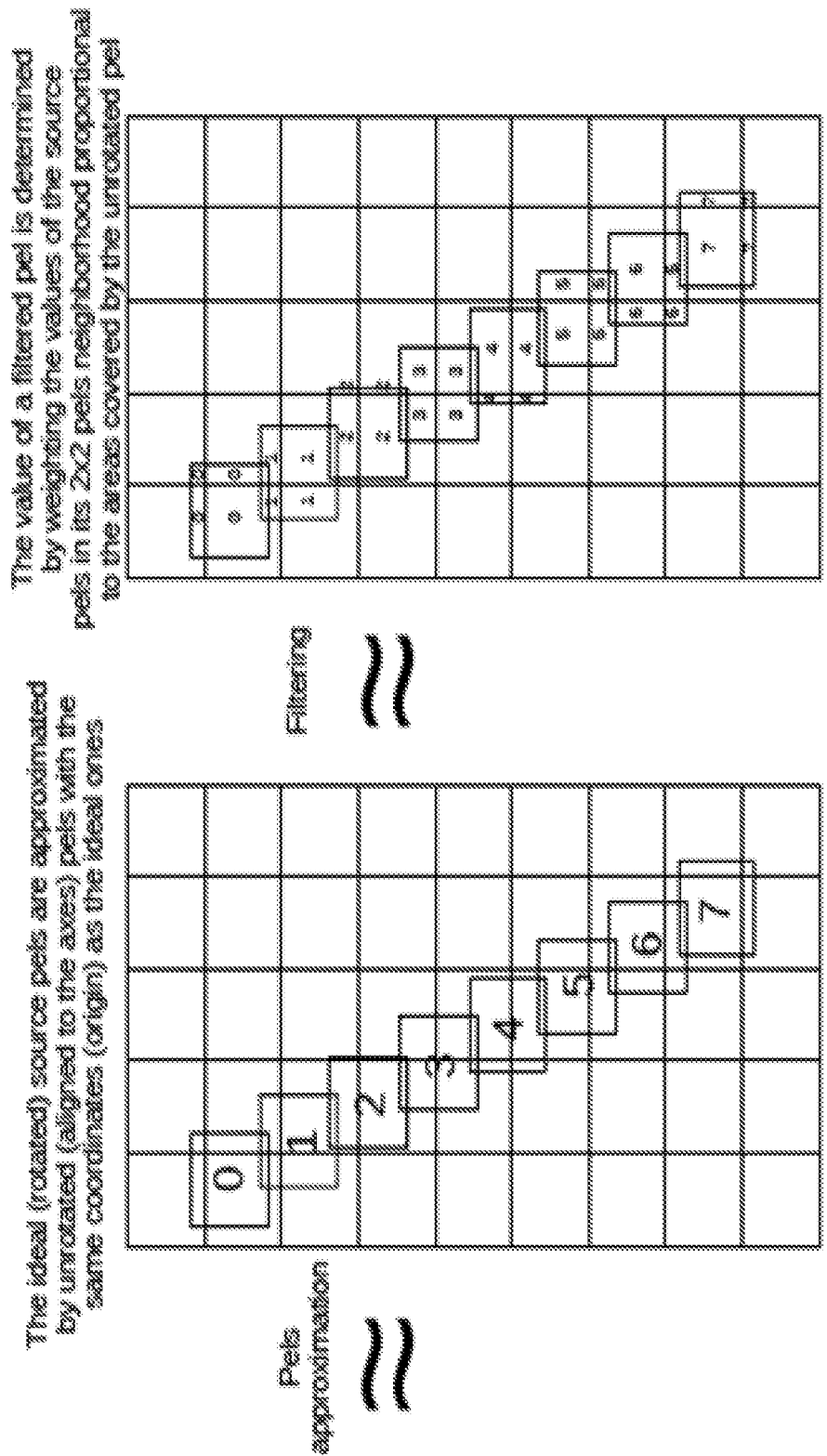

FIGS. 10A-10C illustrate embodiments of an image inverse transform process via source image caching. FIG. 10A illustrates source image caching in which a source area within a bounding box is copied into a cache 1000 for insertion by the inverse transform into the destination tile. FIG. 10B shows an embodiment in which eight destination pels from a source bounding box are rotated via a processing unit (e.g., implementing a bilinear interpolation process) by copying the pels from cache 1000 into a destination tile.

In one embodiment, eight 8-bit values (64 bits) are obtained by determining each destination pixel with the set of pixels that contribute to the value. Each of these pixels fill a percentage of the destination pixel, and the destination area's percentage of the source value of each contributing pixel is used to determine the final value of the destination pixel when the contributing values are added. In some embodiments, the "2×2 source bounding box" sometimes has more than four contributing pixels. For example, the 8th destination pixel (bottom right-most) has a contribution from 5 source pixels in FIG. 10B. In other embodiments, the ideal (rotated) source image pixels are approximated by unrotated (aligned to the axes) pixels with the same coordinates (origin) as the ideal ones, and the value of each filtered pixel is determined by weighting the values of the source image pixels in its 2×2 pixel neighborhood proportional to the areas covered by the unrotated pixel, as shown in FIG. 10C.

Figure 11:
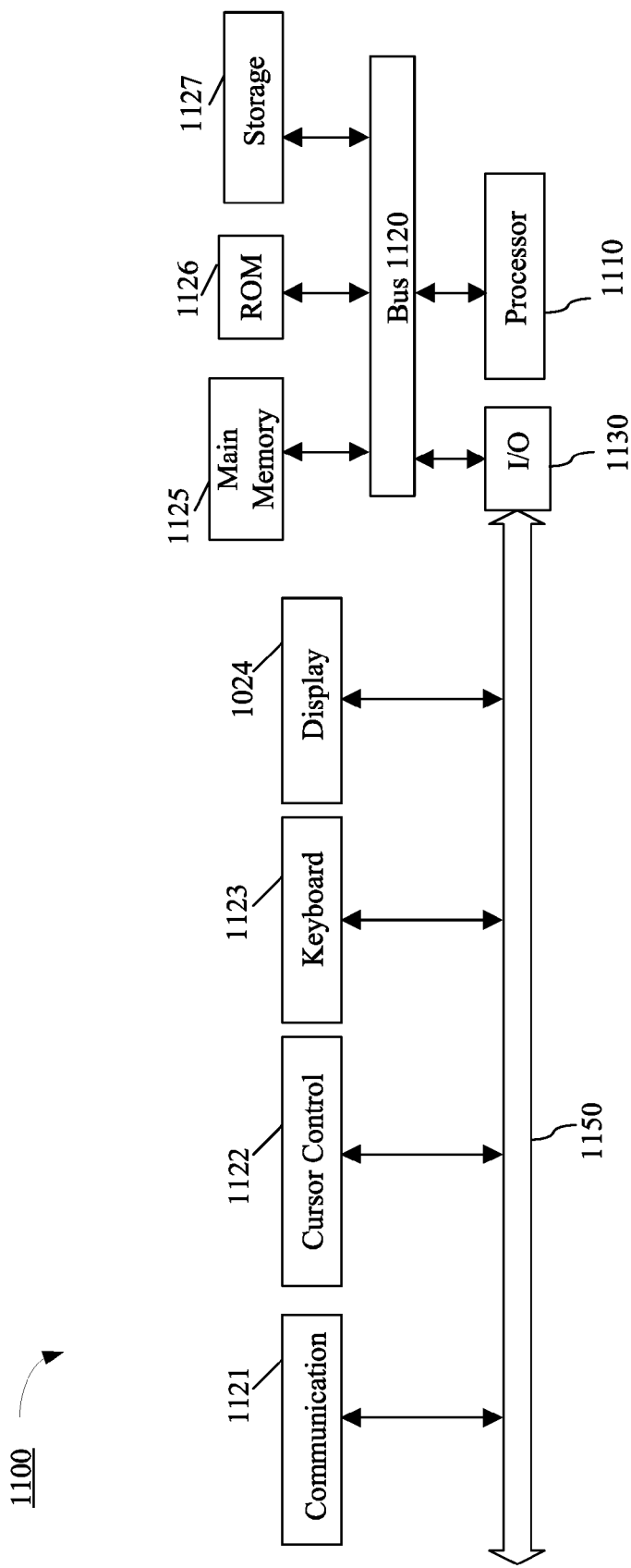
FIG. 11 illustrates one embodiment of a computer system.

FIG. 11 illustrates a computer system 1100 on which compressed bitmap generator 100 and/or decompressors 125 may be implemented. Computer system 1100 includes a system bus 1120 for communicating information, and one or more processors 1110 coupled to bus 1120 for processing information.

Computer system 1100 further comprises a random access memory (RAM) or other dynamic storage device 1125 (referred to herein as main memory), coupled to bus 1120 for storing information and instructions to be executed by processor 1110. Main memory 1125 also may be used for storing temporary variables or other intermediate information during execution of instructions by processor 1110. Computer system 1100 also may include a read only memory (ROM) and or other static storage device 1126 coupled to bus 1120 for storing static information and instructions used by processor 1110.

A data storage device 1125 such as a magnetic disk or optical disc and its corresponding drive may also be coupled to computer system 1100 for storing information and instructions. Computer system 1100 can also be coupled to a second I/O bus 1150 via an I/O interface 1130. A plurality of I/O devices may be coupled to I/O bus 1150, including a display device 1124, an input device (e.g., an alphanumeric input device 1123 and or a cursor control device 1122). The communication device 1121 is for accessing other computers (servers or clients). The communication device 1121 may comprise a modem, a network interface card, or other well-known interface device, such as those used for coupling to Ethernet, token ring, or other types of wired or wireless networks.

Embodiments of the invention may include various processing blocks as set forth above. The processing blocks may be embodied in machine-executable instructions. The instructions can be used to cause one or more general-purpose or special-purpose processors to perform certain processing blocks. Alternatively, these processing blocks may be performed by specific hardware components that contain hardwired logic for performing the processing blocks, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims that follow.

What is claimed is:

1. A machine-readable medium including instructions, which when executed by a machine, causes the machine to perform image processing to:
   intersect a clip polygon with a source image;
   determine destination coordinates of the clip polygon;
   rasterize the clip polygon;
   determine a bounding box comprising a section of a destination sidemap;
   divide the bounding box into a plurality of logical destination tiles;
   process each of the logical destination tiles to determine coordinates of source tiles in the source image corresponding to each of the logical destination tiles by performing an inverse transformation; and perform rotation processing of the source tiles, wherein each tile is processed independently.

2. The machine-readable medium of claim 1, including instructions, which when executed by a machine, further causes the machine to merge the rasterized clip polygon with an alpha mask into a single alpha mask corresponding to a source raster image.

3. The machine-readable medium of claim 1, wherein coordinates of the source tiles are determined via an inverse two-dimensional (2D) affine transformation.

4. The machine-readable medium of claim 3, including instructions, which when executed by a machine, further causes the machine to:
determine whether a source tile lies outside of a source image; and
skip the logical destination tile upon a determination that the source tile lies outside of the source image.

5. The machine-readable medium of claim 4, including instructions, which when executed by a machine, further causes the machine to:
determine whether the source tile is within the clip polygon; and
skip the logical destination tile upon a determination that source tile is not within the clip polygon.

6. The machine-readable medium of claim 5, including instructions, which when executed by a machine, further causes the machine to:
determine whether the source tile is partially within the source image; and
perform rotation processing on each pel within the source tile upon a determination that source tile is partially within the source image.

7. The machine-readable medium of claim 6, including instructions, which when executed by a machine, further causes the machine to:
determine whether the source tile is transparent; and
skip the logical destination tile upon a determination that the source tile is transparent.

8. The machine-readable medium of claim 7, including instructions, which when executed by a machine, further causes the machine to:
determine whether the source tile is a solid color; and
rotate the source tile upon a determination that the source tile is a solid color.

9. The machine-readable medium of claim 8, wherein the source tile is rotated by setting pels in a logical destination tile with the solid color of the source tile.

10. The machine-readable medium of claim 8, including instructions, which when executed by a machine, further causes the machine to:
cache the source tile upon a determination that the source tile is not a solid color; and
rotate and transform the tile via a bilinear interpolation.

11. A system comprising one more processors to perform image processing to intersect a clip polygon with a source image, determine destination coordinates of the clip polygon, rasterize the clip polygon, determine a bounding box comprising a section of a destination sidemap, divide the bounding box into a plurality of logical destination tiles, process each of the logical destination tiles to determine coordinates of source tiles in the source image corresponding to each of the logical destination tiles by performing an inverse transformation and perform rotation processing of the source tiles, wherein each tile is processed independently.

12. The system of claim 11, wherein the processor further to merge the rasterized clip polygon with an alpha mask into a single alpha mask corresponding to a source raster image.

13. The system of claim 11, wherein coordinates of the source tiles are determined via an inverse two-dimensional (2D) affine transformation.

14. The system of claim 13, wherein the processor further to determine whether a source tile lies outside of a source image and skip the logical destination tile upon a determination that the source tile lies outside of the source image.

15. The system of claim 14, wherein the processor further to determine whether the source tile is within the clip polygon and skip the logical destination tile upon a determination that source tile is not within the clip polygon.

16. The system of claim 15, wherein the processor further to determine whether the source tile is partially within the source image and perform rotation processing on each pel within the source tile upon a determination that source tile is partially within the source image.

17. The system of claim 16, wherein the processor further to determine whether the source tile is transparent and skip the logical destination tile upon a determination that source tile is transparent.

18. The system of claim 17, wherein the processor further to determine whether the source tile is a solid color and rotate the source tile upon a determination that the source tile is a solid color.

19. The system of claim 18, wherein the source tile is rotated by setting pels in a logical destination tile with the solid color of the source tile.

20. The system of claim 18, wherein the processor further to cache the source tile upon a determination that the source tile is not a solid color and rotate and transform the tile via a bilinear interpolation.

* * * * *